United States Patent [19]

Bosshold

[11] 3,902,450

[45] Sept. 2, 1975

[54] DATA ENCODING IDENTIFICATION DEVICE

[76] Inventor: Barry L. Bosshold, 2185 Wilkins Ave., Napa, Calif. 94558

[22] Filed: Dec. 3, 1973

[21] Appl. No.: 420,961

[52] U.S. Cl. ...... 116/135; 116/DIG. 3; 116/DIG. 23
[51] Int. Cl.² .......................................... G09F 9/00
[58] Field of Search ........ 116/135, DIG. 3, DIG. 23, 116/130; 128/2 R; 40/64 R, 65; 35/30, 2

[56] References Cited
UNITED STATES PATENTS

| | | | |
|---|---|---|---|
| 2,610,792 | 9/1952 | Kaufman | 116/135 |
| 3,363,837 | 1/1968 | Gassino | 116/135 |
| 3,680,525 | 8/1972 | Berge | 116/135 |

Primary Examiner—S. Clement Swisher
Assistant Examiner—Denis E. Corr
Attorney, Agent, or Firm—Melvin R. Stidham, Esq.

[57] ABSTRACT

A data encoding device useful in identifying an unknown enteric organism isolated from a clinical specimen. A plurality of slides, each representing a particular laboratory test are movable selectively from a pre-test position to either of two test result positions depending upon whether the test is positive or negative. Symbols on the slide appear in windows, each window for a particular organism, to show whether or not the test result is compatible with the presence of such organism.

7 Claims, 4 Drawing Figures

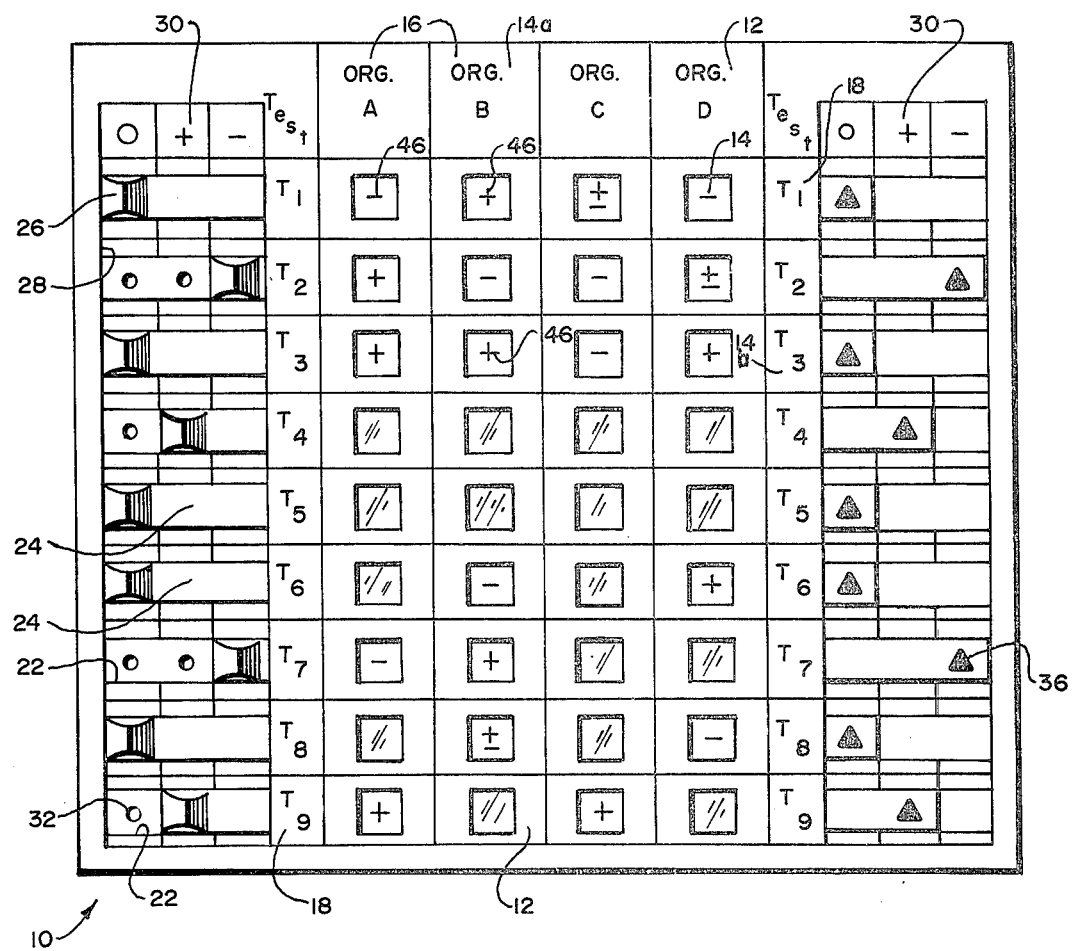
FIG. 1
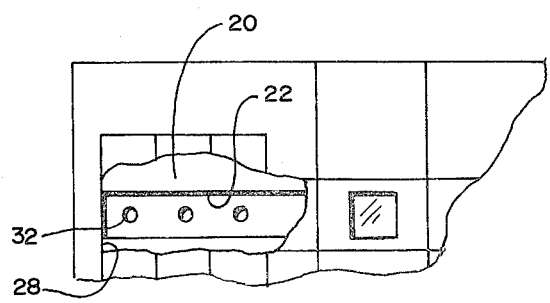
FIG. 2
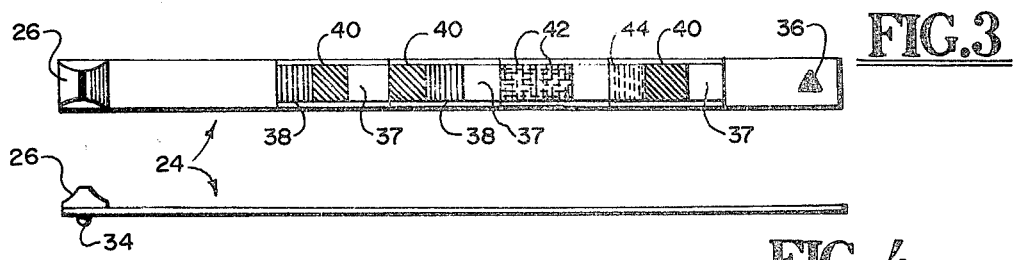
FIG. 3
FIG. 4

3,902,450

DATA ENCODING IDENTIFICATION DEVICE

BACKGROUND OF THE INVENTION

In medical laboratory test work involving the identification of an enteric organism which has been isolated from a clinical specimen, it is conventional practice to run a series of tests, each of which may tend to rule out one or more organisms as that being identified. The results of each test are compared with available charts and data, the entries for each test indicating whether or not the test result was contrary to, or compatible with, a test result which would have been produced in the presence of each of several suspected organisms. In some instances, the entries must be measured in terms of mere probabilities and in some instances, the entry recorded must be merely inconclusive. Such laborious data comparisons are time consuming and, as the reference charts expand with each additional test, the results become increasingly difficult to analyze, compare and reconcile.

OBJECTS OF THE INVENTION

It is an object of this invention to provide a device for recording the results of tests on an isolated organism which will give a quick and simple indication narrowing the possibilities for identification of the isolated organism.

It is a further object of this invention to provide a specimen analysis recording chart which provides an instant and continuing reading of test results performed, as they indicate the presence or absence of suspected constituents.

It is a further object of this invention to give a device for recording the results of a series of tests on a specimen which will enable one to tell at a glance the tests which have been run and those which remain to be run.

It is a further object of this invention to provide a device for recording the results of tests on an organism isolated from a clinical specimen which will enable one to tell at a glance whether the result of a particular test was compatible with or contrary to the result to be anticipated with any one of a plurality of enteric organisms.

It is a further object of this invention to provide a data encoding device which will enable one to scan encoded test results for rapid identification of an isolated organism.

Other objects and advantages of this invention will become apparent from the description to follow when read in conjunction with the accompanying drawing.

SUMMARY OF THE INVENTION

In carrying out this invention, I provide a chart which has a plurality of windows arranged in vertical and horizontal rows. Behind one of the groups of rows, e.g. the horizontal rows, a series of slide strips are movable. Each strip is representative of a particular laboratory analysis test and is movable from an 0, or pre-test position, to either a + or a − position depending upon whether there is a positive or negative test result. Each of the other rows of windows is representative of a particular constituent, such as an enteric organism, which may or may not be in a specimen being identified. Arranged along the length of each slide is a series of symbols, such as coded colors, in sets of three for each window position. The first symbol of each set is of the same color code to indicate that the test has not been run. The remaining two color codes of each set indicate, for each of the positive and negative positions of the slide, whether the test result is, or is not, compatible with the test result had that particular organism been present. Other codes may be provided to show that the test result is absolutely and irrefutably incompatible with the presence of the organism or that the test result is inconclusive for that particular organism. Then, as each test is performed, the operator moves the particular slide for that test to the plus or minus position depending upon whether the result is positive or negative and the appropriate colored codes will appear in the windows for each organism. Means are provided to hold the slide in the selected position whereby as a series of tests are performed, the operator will have a running account for each organism that is readily and quickly readable and will enable him to rule out the possibility of certain organisms and, thereby, reduce the number of tests required to ascertain the identity of the unknown, isolated organism.

BRIEF DESCRIPTION OF THE DRAWINGS

In the drawings:

FIG. 1 is a top view of a data encoding device embodying features of this invention;

FIG. 2 is an enlarged partial view broken away showing details of the data encoding device; and FIGS. 3 and 4 are top and side views of a slide constituting a feature of this invention.

DESCRIPTION OF A PREFERRED EMBODIMENT

Referring now to the drawings with greater particularity, the data encoding identification device 10 of this invention may be formed of a relatively rigid material such as sheet metal, plastic or the like, and includes a front panel 12 in which are formed a plurality of windows 14 of transparent plastic or the like, arranged in horizontal and vertical rows. As shown, each vertical row 14a may be representative of a particular organism or other constituent which could possibly be that specimen the identity of which is being sought. Each horizontal row 14b is representative of a particular test which may be performed on the organism in order to effect the identification. Accordingly, vertical colum headings 16 identify the organisms under search and horizontal column heads 18 identify the tests to be undertaken.

Disposed behind the front panel is a back or slideway panel 20 which is grooved at 22 or otherwise formed to provide a plurality of slideways in each of which is carried a slide strip 24. Each slide strip has a handle 26 at one end which is exposed through a window 28 in the front panel to facilitate manipulation. If desired, the handle 26 on alternate slide strips may be positioned at opposite sides of the strips 24.

In position column heading 30 at both sides of the device 10, there are shown three positions 0, + and − which indicate the three positions into which each slide 24 may be moved. Three small depressions 32 may be formed in the base of the slideway 22 to be engaged by a complementary detent 34 (FIG. 4) on the bottom of the slide strip 24 to hold the slide in any of the three positions to which it may be moved. A marker 36 at the other end of the slide is provided to further indicate the slide position.

As illustrated in FIG. 3, each slide 24 is provided with a plurality of symbols in sets of three for each vertical window row 14a. Each symbol is designed to indicate the compatibility of a test result as evidenced by the slide position with the test result to be anticipated in the presence of the particular organism. Preferably, the symbols are in the form of color codes and, for each vertical window position 14a, a white code block 37 is positioned to appear in the window when the strip is in its 0 position, to show that the particular test represented by the slide, has not been run. In addition, a red code block 38 may be used to show that the test result is contrary to what might be expected for the particular organism and green 40 to indicate that the test is consistent with what might be expected with the particular organism present. In fact, the indicator may be even more precise than that, and I have added the yellow code 42 to show that the test is not conclusive for that particular organism and the color purple 44 to indicate that the organism may absolutely be ruled out without further testing because that particular test result is irrefutably inconsistent with the presence of the organism.

As a further aid, each window 14 may be marked at 46 with the expected test result if that particular organism were present in the test specimen.

In operation, all the slides are moved to the left or 0 position before the series of test is run. This brings the white code symbol in each window as a constant reminder that the test has not been performed. Then, after a particular test is run, the slide is moved to the + or − position, depending upon the test result, and the appropriate code would appear in each of the windows. For example, in the slide shown in FIG. 3, movement of the slide to the minus position would bring the red block 38 under the window for organism A to show that that is probably not the identity of the organism under analysis; the green block would appear under organism B to show that it might be present; the yellow block would appear under organism C to show that the test is not conclusive with respect to that organism; and the purple block would appear under organism D to rule it out absolutely without need of further tests. Similarly, if the slide were moved to the middle or plus position, organism A may be present requiring further tests; organism B is probably ruled out; organism C again requires further testing; and organism D may be present also requiring further testing.

While this invention has been described in conjunction with a preferred embodiment thereof, it is obvious that modifications and changes therein may be made by those skilled in the art without departing from the spirit and scope of this invention.

What is claimed is:

1. A data encoding and recording device for identification tests on an unknown entity comprising:
   a front panel;
   a plurality of windows in said front panel arranged in first and second perpendicular series of rows thereof;
   means forming a plurality of slideways behind said first series of rows of windows;
   a plurality of slide strips slidably received in said slideways;
   each of said slide strips being representative of a test to be performed on an unknown entity;
   indicia on said second series of rows of windows, each representative of a known entity;
   means defining three positions of each of said slide strips along the slideway receiving it, a first position in which said slide strip is positioned prior to performance of the test represented thereby, a second position representative of one test result and a third position representative of another distinct test result; and
   coded symbols on each of said slide strips which appear in the row of windows said strip underlies when said strip is in said second and third positions;
   a certain first type of said slide symbols, underlying associated windows indicating that the test result represented by that one of the second and third positions to which said strip is moved is contrary to the test result to be achieved in the presence of the known entity represented by that one of the second series of windows in which the symbol appears.

2. The data encoding and recording identification device defined by claim 1 wherein:
   a certain second type of said symbols underlying associated windows indicate that the test result represented by that one of the second and third positions to which said strip is moved is consistent with the test result to be achieved in the presence of the known entity represented by that one of the second series of windows in which the symbol appears.

3. The data encoding and recording device defined by claim 1 wherein:
   a certain third type of said symbols underlying associated windows indicate that the test result represented by that one of the second and third positions to which said strip is moved may or may not be consistent with the test result to be achieved in the presence of the known entity represented by that one of the second series of windows in which the symbol appears.

4. The data encoding and recording identification device defined by claim 1 wherein:
   a certain fourth type of said symbols underlying associated windows indicate that the test result represented by that one of the second and third positions to which said strip is moved is irrefutably contrary to the test result to be achieved in the presence of the known entity by that one of the second series of windows in which the symbol appears.

5. The data encoding and recording identification device defined by claim 1 wherein:
   a certain fifth type of said symbols underlying associated windows represent positions to which said strip is moved is probably contrary to the test result to be achieved in the presence of the known entity represented by that one of the second series of windows in which the symbol appears.

6. The data encoding and recording device defined by claim 1 including:
   pre-test indicia on each of said slide strips which appear in the row of windows said strip underlies when said strip is in said first position.

7. The data encoding and recording device defined by claim 1 including:
   signs on said front panel associated with said windows, each indicating the test result to be achieved by the test in the presence of the known entity represented by the window with which said sign is associated.

* * * * *